United States Patent
Chen et al.

(10) Patent No.: US 12,430,598 B2
(45) Date of Patent: Sep. 30, 2025

(54) TRANSFER CONTROL STEP FOR DIGITAL WORKFLOWS

(71) Applicant: ServiceNow, Inc., Santa Clara, CA (US)

(72) Inventors: Jingfei Chen, San Francisco, CA (US); Brian P. Bimschleger, Highland Park, IL (US); Jacob S. Burman, Carlsbad, CA (US); Jennifer M. Lyons, San Diego, CA (US); Harry Thomas Nelson, San Diego, CA (US); Alberto Alvarado Jimenez, San Diego, CA (US); Reema Shah, San Diego, CA (US); Enrico Cruz, San Diego, CA (US); Andrew K. Fry, Encinitas, CA (US)

(73) Assignee: ServiceNow, Inc., Santa Clara, CA (US)

( * ) Notice: Subject to any disclaimer, the term of this patent is extended or adjusted under 35 U.S.C. 154(b) by 197 days.

(21) Appl. No.: 18/226,144

(22) Filed: Jul. 25, 2023

(65) Prior Publication Data
US 2025/0037052 A1    Jan. 30, 2025

(51) Int. Cl.
*G06Q 10/0633* (2023.01)
*G06F 3/04847* (2022.01)

(52) U.S. Cl.
CPC ..... *G06Q 10/0633* (2013.01); *G06F 3/04847* (2013.01)

(58) Field of Classification Search
CPC ........ G06F 1/00–2221/00; G06Q 10/00–50/00
USPC ................................................ 705/7.11–7.42
See application file for complete search history.

(56) References Cited

U.S. PATENT DOCUMENTS

| | | | | |
|---|---|---|---|---|
| 5,734,837 A * | 3/1998 | Flores | ..................... | G06Q 10/10 705/7.26 |
| 5,826,020 A * | 10/1998 | Randell | ................. | G06F 9/5038 709/201 |
| 5,832,455 A * | 11/1998 | Hayashi | ................. | G06Q 10/06 705/7.26 |
| 5,844,554 A * | 12/1998 | Geller | ....................... | G06F 8/34 715/962 |
| 6,986,138 B1 * | 1/2006 | Sakaguchi | ......... | G06Q 10/0633 709/201 |
| 7,848,942 B2 * | 12/2010 | Sadiq | ................... | G06Q 10/063 709/201 |

(Continued)

FOREIGN PATENT DOCUMENTS

CN          101615269          5/2015

*Primary Examiner* — Alan S Miller
(74) *Attorney, Agent, or Firm* — McDonnell Boehnen Hulbert & Berghoff LLP

(57) ABSTRACT

A specification of one or more steps of a digital workflow specified using a graphical user interface is received. An indication of a program transfer control step in the digital workflow to return to a previously specified step in the digital workflow is received. The already specified specification of the one or more steps of the digital workflow is analyzed to determine one or more constraints of the program transfer control step. Based on the determined one or more constraints of the program transfer control step, a configuration of the program transfer control step in the digital workflow is restricted in the graphical user interface.

20 Claims, 14 Drawing Sheets

(56) References Cited

U.S. PATENT DOCUMENTS

| | | | | |
|---|---|---|---|---|
| 8,478,616 B2* | 7/2013 | De Klerk | ............... | G06Q 10/10 |
| | | | | 705/348 |
| 9,696,971 B1* | 7/2017 | Wierda | ............... | G06F 8/36 |
| 10,409,558 B2* | 9/2019 | Kumar | ............... | G06F 3/011 |
| 10,452,360 B1 | 10/2019 | Burman | | |
| 10,545,951 B1* | 1/2020 | Lieberman | ............ | G06F 16/258 |
| 10,949,074 B2 | 3/2021 | Nelson | | |
| 11,288,611 B2 | 3/2022 | Burman | | |
| 11,435,983 B2 | 9/2022 | Burman | | |
| 2002/0152254 A1* | 10/2002 | Teng | ............... | G06Q 10/10 |
| | | | | 718/100 |
| 2003/0004770 A1* | 1/2003 | Miller | ............... | G06Q 10/10 |
| | | | | 717/102 |
| 2004/0078105 A1* | 4/2004 | Moon | ............... | G06Q 10/10 |
| | | | | 700/100 |
| 2004/0078373 A1* | 4/2004 | Ghoneimy | ............ | G06Q 10/10 |
| 2005/0043979 A1* | 2/2005 | Soares | ............... | G06Q 10/10 |
| | | | | 705/7.42 |
| 2006/0005140 A1* | 1/2006 | Crew | ............... | G06Q 10/06 |
| | | | | 715/760 |
| 2006/0143057 A1* | 6/2006 | Sadiq | ............... | G06Q 10/06 |
| | | | | 705/7.26 |
| 2006/0143611 A1* | 6/2006 | Sadiq | ............... | G06Q 10/06 |
| | | | | 718/100 |
| 2008/0120189 A1* | 5/2008 | Singh | ............... | G06Q 30/0601 |
| | | | | 705/16 |
| 2009/0281865 A1* | 11/2009 | Stoitsev | ............ | G06Q 10/06312 |
| | | | | 705/7.22 |
| 2010/0251155 A1* | 9/2010 | Shah | ............... | G06Q 10/0633 |
| | | | | 718/100 |
| 2010/0317420 A1* | 12/2010 | Hoffberg | ............ | G06Q 30/0282 |
| | | | | 463/1 |
| 2011/0209159 A1* | 8/2011 | Baratz | ............... | G06F 16/24575 |
| | | | | 707/E17.112 |
| 2013/0152041 A1* | 6/2013 | Hatfield | ............... | G06Q 10/06 |
| | | | | 717/105 |
| 2013/0297606 A1* | 11/2013 | Tola | ............... | G06F 16/954 |
| | | | | 707/E17.089 |
| 2014/0160521 A1* | 6/2014 | Jahn | ............... | G06F 3/1288 |
| | | | | 358/1.15 |
| 2014/0207724 A1* | 7/2014 | Ledenev | ............... | G06F 21/316 |
| | | | | 706/47 |
| 2017/0310552 A1* | 10/2017 | Wallerstein | ............ | H04L 41/22 |
| 2019/0101882 A1* | 4/2019 | Strinden | .......... | G05B 19/41865 |
| 2020/0092178 A1 | 3/2020 | Nelson | | |
| 2021/0240312 A1* | 8/2021 | Wohlstadter | .......... | G06F 3/0482 |
| 2022/0027806 A1 | 1/2022 | Burman | | |
| 2024/0094884 A1 | 3/2024 | Bradley | | |
| 2025/0156810 A1 | 5/2025 | Olsson | | |

* cited by examiner

TRANSFER CONTROL STEP FOR DIGITAL WORKFLOWS

BACKGROUND OF THE INVENTION

Digital workflow tools enable non-programmers to create functional workflows with little to no programming knowledge. The created workflows can automate complex manual tasks and can implement business related functionalities, such as actions related to human resources procedures, information technology ticketing, integrations with third-party services, etc. Users typically interface with a digital workflow tool using drag-and-drop operations via a graphical user interface. The workflow tools used to create digital workflows can be hosted as cloud services.

BRIEF DESCRIPTION OF THE DRAWINGS

Various embodiments of the invention are disclosed in the following detailed description and the accompanying drawings.

DETAILED DESCRIPTION

Figure 1:
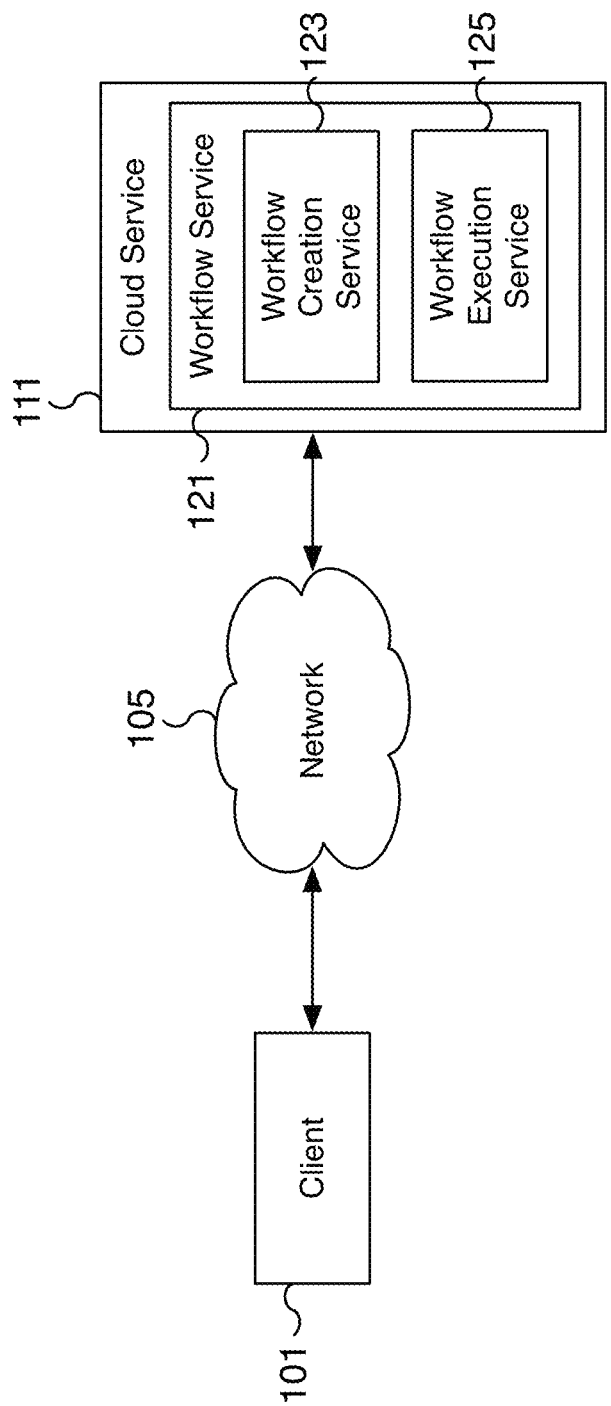
FIG. 1 is a block diagram illustrating an example of a network environment for creating and executing digital workflows using a low code or codeless workflow service.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A transfer control step for digital workflow creation is disclosed. For example, using a low-code or codeless workflow tool, a user with little to no programming knowledge can implement a transfer control step within a digital workflow. In various embodiments, a user can insert the disclosed transfer control step into a workflow using low-code or codeless interactions (e.g., specified insertion, drag-and-drop action, gesture, etc.). Upon insertion of the transfer control step into the workflow, a representation of the workflow, such as an abstract syntax tree, is updated. The available target nodes to which control transfer is valid are identified based on the location of the transfer control step node within the representation of the workflow. For example, the node of the transfer control step within an abstract syntax tree is identified. Using the representation of the workflow, a transfer control ruleset is applied to determine valid and invalid target nodes. In some embodiments, a valid target node is identified by determining that the node is a parent of the transfer control step node and a conditional branch node resides along the same branch between the target node and the transfer control step node. Nodes are marked as either a valid or invalid target and the graphical user interface (GUI) of the workflow tool is updated accordingly. For example, within the GUI of the workflow tool, workflow steps corresponding to nodes that are valid targets are highlighted or otherwise identified as valid targets. The GUI further restricts the transfer control step to targeting only the workflow steps that are valid target nodes.

In some embodiments, a specification of one or more steps of a digital workflow specified using a graphical user interface is received. For example, a user can add steps to a digital workflow such as a digital workflow used to model and automate a business process. Example workflows include workflows for implementing business processes related to human resources procedures, information technology ticketing, integrations with third-party services, application approvals, etc. As one example, a digital business process workflow can be created to automate the process of applying and receiving approval for a building permit. In some embodiments, an indication of a program transfer control step in the digital workflow to return to a previously specified step in the digital workflow is received. For example, an example permit application workflow can receive a request to insert a "Go back to" step that transfers control of the workflow execution to an earlier step in the workflow. The step can be implemented to allow the applicant to re-submit a new permit application in the event the initial application was denied.

In some embodiments, the already specified specification of the one or more steps of the digital workflow is analyzed to determine one or more constraints of the program transfer control step. For example, the existing workflow and its steps are analyzed to determine which steps are valid targets of the "Go back to" transfer control step and constraints are applied to limit the target step to only valid targets. In some embodiments, a configuration of the transfer control step in the digital workflow is restricted in the graphical user interface (GUI) based on the determined one or more constraints of the program transfer control step. For example, the GUI of the workflow tool is updated to visually distinguish which steps are valid target steps to which control of the workflow execution can be transferred. The GUI can further prevent the user from targeting invalid steps. For example, a list of valid steps can be highlighted and/or displayed as part of inserting the transfer control step, allowing the user to connect the program transfer control step interactively and visually to the desired valid target step using the workflow tool GUI. In various embodiments, the transfer control step can be displayed and/or presented to the user as a "Go back to" step in the workflow GUI.

FIG. 1 is a block diagram illustrating an example of a network environment for creating and executing digital workflows using a low code or codeless workflow service. In the example shown, client 101 and cloud service 111 are connected via network 105. Network 105 can be a public or private network. In some embodiments, network 105 is a public network such as the Internet. In various embodiments, cloud service 111 offers multiple application services including workflow service 121. Workflow service 121 includes workflow creation service 123 and workflow execution service 125. Other services can be offered as well but are not shown, such as a configuration management database (CMDB) service. Cloud service 111 is communicatively connected to client 101 and offers its application services to clients such as client 101. For example, client 101 utilizes workflow service 121 of cloud service 111 to create and execute digital workflows. The digital workflows can be created using workflow service 121 by users with little to no programming experience.

In some embodiments, client 101 is an example client for accessing application services offered by cloud service 111. For example, client 101 can be a network device such as a desktop computer, a laptop, a mobile device, a tablet, a kiosk, a voice assistant, a wearable device, or another network computing device. As a network device, client 101 can access cloud-based services including the ability to create and execute a workflow using workflow service 121 and particularly workflow creation service 123 and workflow execution service 125. For example, a human resources team member can utilize a web browser or similar application from client 101 to create a workflow using workflow creation service 123 for submitting a business expense for reimbursement. The workflow may include multiple subflows such as the ability to submit an expense and the ability to check the progress of the expense's reimbursement request. Once created, a workflow can be executed using workflow execution service 125. Moreover, using workflow execution service 125, the execution of the workflow can be monitored, for example, from client 101. In various embodiments, the initial workflow can be created using a low-code or codeless workflow creation tool of workflow creation service 123.

In some embodiments, cloud service 111 is a cloud-based application service that offers multiple cloud services including workflow service 121. In the example shown, workflow service 121 includes workflow creation service 123 and workflow execution service 125. In various embodiments, workflow creation service 123 includes a low-code or codeless tool for creating workflows such as integrated services for implementing actions and/or steps for business related functionalities. Example workflows can be created for human resources procedures, information technology ticketing, integrations with third-party services, etc. The created workflows can model and automate business processes and can utilize the disclosed control transfer action that allows a digital workflow to transfer program execution control to a previous step. For example, a permit approval workflow can include a "Go back to" transfer control step that transfers control to an earlier step of the workflow (to modify and re-submit the permit application) in the event a permit is denied. In various embodiments, the created workflows are hosted by workflow execution service 125 for execution as a cloud service. For example, clients such as client 101 can access a created workflow for execution using workflow execution service 125 of workflow service 121. In some embodiments, clients can monitor the execution of a workflow and/or trace through the steps of a previously executed workflow using workflow execution service 125 of workflow service 121.

In some embodiments, the components shown in FIG. 1 may exist in various combinations of hardware machines. Although single instances of some components have been shown to simplify the diagram, additional instances of any of the components shown in FIG. 1 may exist. For example, cloud service 111 can include one or more cloud-based servers including one or more servers for each of workflow service 121. The included servers can include distributed servers including web servers, application servers, and database servers, among others. Although cloud service 111 includes workflow service 121 with workflow creation service 123 and workflow execution service 125, other services can be implemented and hosted by cloud service 111 as well. As shown in FIG. 1, client 101 is just one example of a potential client to cloud service 111. In some embodiments, components not shown in FIG. 1 may also exist.

Figure 2:
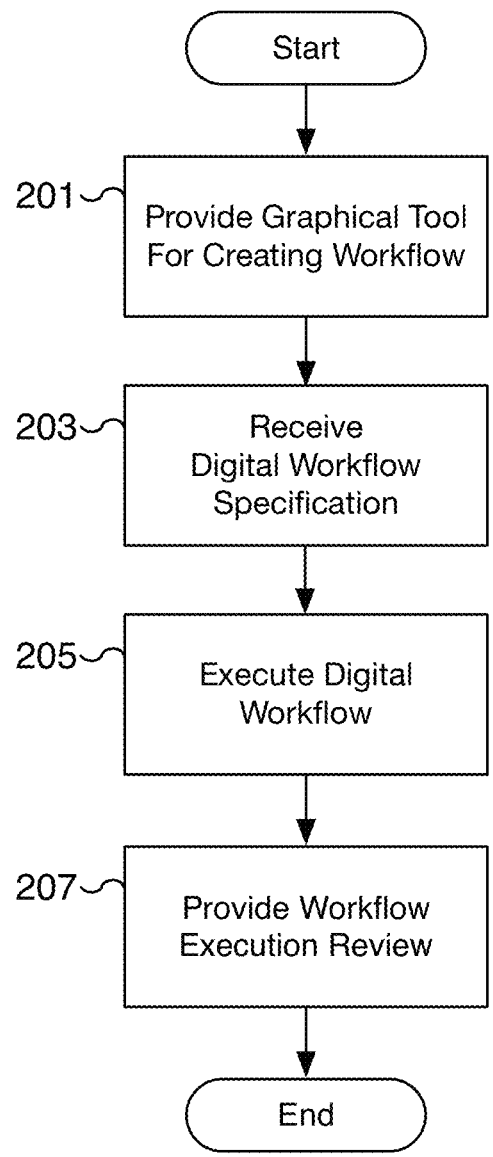
FIG. 2 is a flow chart illustrating an embodiment of a process for creating and executing digital workflows using a low code or codeless workflow service.

FIG. 2 is a flow chart illustrating an embodiment of a process for creating and executing digital workflows using a low code or codeless workflow service. For example, using the process of FIG. 2, a user with little to no programming experience can create and execute a digital workflow that models and automates a business process. The workflow is created using a low-code or codeless tool provided by a workflow creation service. In some embodiments, the process of FIG. 2 is performed by a cloud-based workflow service such as workflow service 121 of FIG. 1. In some embodiments, the digital workflow is created using workflow creation service 123 of FIG. 1 and executed using workflow execution service 125 of FIG. 1.

At 201, a graphical tool is provided for creating a digital workflow. For example, a graphical user interface such as a web-based application is provided to a user via a cloud-based workflow creation service. The graphical tool allows a user to create a workflow by manipulating (such as adding, editing, rearranging, deleting, modifying, etc.) the steps of the workflow. In various embodiments, the modifications to the workflow can be performed using drag-and-drop operations or other codeless or low-code actions that do not require programming knowledge.

At 203, a digital workflow specification is received. For example, using drag-and-drop or other similar operations, a specification of the workflow is received including the steps of the workflow. For example, a workflow with multiple steps, including conditional and transfer control steps, can be received such as a digital workflow for approving an expense reimbursement. The example workflow can include a first step to prompt a user to provide a completed expense reimbursement request, a second step to verify the request was correctly received, and a third step to evaluate the request for approval. A fourth conditional step can process a branch of steps in the event the request was approved, and a second conditional step can transfer control back to the first step in the event the application was rejected. Other digital workflows including more complex workflows can be received including workflows that include other types for flow control steps.

At 205, the digital workflow is executed. For example, the digital workflow of the specification received at 203 is executed to automate the associated business process. In various embodiments, the workflow can be accessed via a cloud service such as a workflow execution service. For example, a client can utilize the service with the example workflow of step 203 to submit a business expense for reimbursement. Other example workflows related to the same workflow could include a workflow to check on the status of the reimbursement or retrieve of list of all outstanding reimbursement requests.

At 207, review of the workflow execution is provided. For example, the workflow execution performed at 205 can be monitored in real time and/or after the execution has completed. In various embodiments, a specific execution instance of the workflow performed at 205 can be reviewed such as via a workflow execution service. In some embodiments, a user such as an administrator can step through each step of a past workflow's execution and review the status of the execution such as the values of variables or return values utilized during the workflow's execution. For example, an administrator can review the result of evaluating a request for approval such as whether a specific request was approved or denied.

Figure 3:
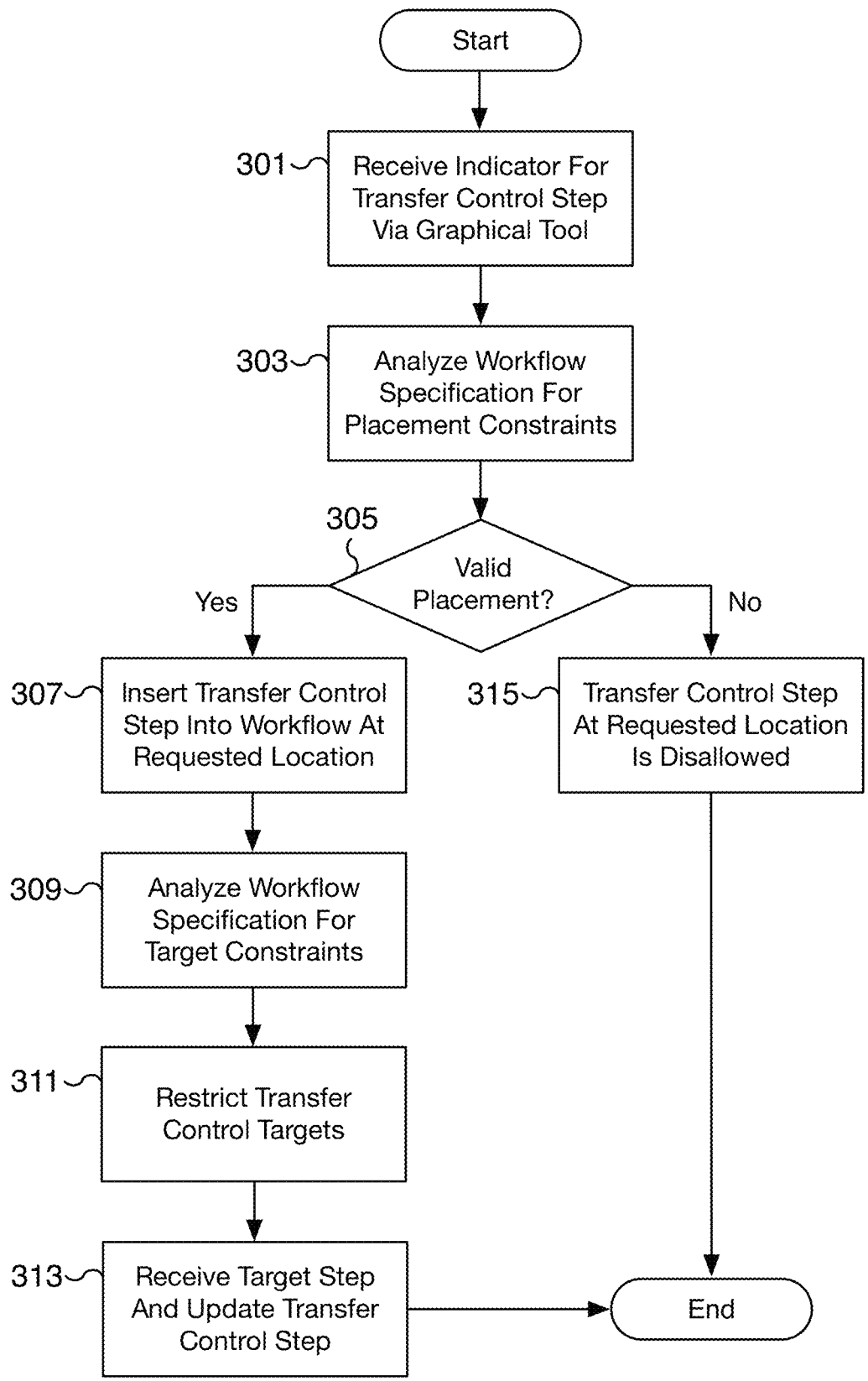
FIG. 3 is a flow chart illustrating an embodiment of a process for creating a digital workflow with a transfer control logic/action using a low code or codeless workflow service.

FIG. 3 is a flow chart illustrating an embodiment of a process for creating a digital workflow with a transfer control logic/action using a low code or codeless workflow service. For example, using the process of FIG. 3, a user with little to no programming experience can insert a transfer control or "Go back to" step into a digital workflow using a low code or codeless tool of a workflow creation service. In various embodiments, when the transfer control step is executed, execution of the workflow will transfer to a configured previous step of the workflow. In some embodiments, the process of FIG. 3 is performed by a workflow creation service as part of creating a digital workflow. In some embodiments, the process of FIG. 3 is performed at 203 of FIG. 2 by workflow creation service 123 of FIG. 1.

At 301, an indicator for a transfer control step is received via a graphical tool. For example, in response to a user action made via the graphical workflow tool, an indicator for a transfer control step is received by the workflow creation service. The indicator can correspond to the user attempting to insert or add a transfer control or "Go back to" step into a digital workflow. In some embodiments, a request to add a transfer control step into a workflow is specified using the graphical tool. For example, one or more user interface elements are selected to insert the transfer control step. In another example, a user interface element representing a "Go back to" step is dragged into a location of a visual representation of the workflow. As part of receiving the indicator for the additional transfer control step, the received indication specifies where the step is added within the workflow. For example, a representation of the digital workflow, such as an abstract syntax tree, is referenced to reflect where a node corresponding to the transfer control step will potentially be located. In various embodiments, the potential transfer control step node, if approved, would have a parent node representing the step preceding the transfer control step.

At 303, the workflow specification is analyzed for placement constraints. For example, a representation of the workflow specification is analyzed to determine transfer control constraints related to the placement of the transfer control step. In some embodiments, the transfer control step corresponding to the indicator received at 301 is analyzed to determine whether the requested transfer control step is placed in a valid location. For example, one or more rules of a ruleset are applied to identify whether the requested location within a workflow is a valid location for a transfer control step. In particular embodiments, certain locations may be invalid due to an identified workflow functionality risk created by placing the step at one of the invalid locations, such as the possibility that the step will create an infinite loop. The invalid locations for the target steps can be identified by analyzing a representation of the workflow such as an abstract syntax tree representing the workflow and its steps.

In various embodiments, the ruleset includes one or more rules that can each result in a placement constraint including a determination that the placement of the transfer control step is invalid (or valid). For example, a ruleset can include one or more rules that require the placement of the transfer control node dependent on a logic branch, such as after an If/Else/Else If conditional action, after a decision action (such as after a "Make a Decision" action), or within a catch of a try action (or clause). Other branch or conditional actions can be specified and/or supported as well. In some embodiments, the rules of the ruleset prevent a transfer control node from being placed within a parallel branch, such as within a "Do the following in parallel" action branch, as the final action in a logical flow without branches, and/or in a location that would create an infinite loop. In various embodiments, the ruleset can be configured with multiple rules depending on number and/or type of constraints that should be applied to the transfer control action.

At 305, a determination is made whether the placement of the transfer control step is valid. For example, an invalid transfer control step can correspond to one placed at an invalid location. In response to a determination that the placement of the transfer control step is valid, processing proceeds to 307. In response to a determination that the transfer control step is invalid, processing proceeds to 315.

At 307, the transfer control step is inserted into the workflow at the requested location. For example, in response to verifying that the requested location for the requested transfer control step is valid, the transfer control step is inserted into the workflow. In some embodiments, the representation of the workflow is updated. For example, a new node corresponding to the new step can be inserted into a tree representing the workflow such as into an abstract syntax tree. In various embodiments, the GUI of the workflow tool is also updated to reflect the inserted step. For example, a partially completed transfer control step can be displayed in a visual representation of the workflow. The step can be shown as partially completed since the target of the transfer control step has not been configured.

At 309, the workflow specification is analyzed for target constraints. For example, the workflow is analyzed to determine which steps of the workflow are valid targets for the requested transfer control step. In some embodiments, an abstract syntax tree representing the workflow and its steps is analyzed to determine which steps are valid targets of a valid transfer control step. For example, one or more rules of a ruleset are applied to the nodes corresponding to the steps of the workflow to determine whether each node (and its associated step) is a valid or an invalid target. In some embodiments, the application of the ruleset includes marking the nodes of a workflow tree, such as an abstract syntax tree representing the workflow, as either a valid or invalid target for the transfer control step.

At 311, transfer control targets are restricted. For example, based on the analysis performed at 309, steps of the workflow corresponding to invalid targets are restricted from being a target of the transfer control step. In some embodiments, the graphical tool for creating the workflow is updated to display the valid and/or invalid target steps. For example, the graphical workflow tool can restrict the user from linking the "Go back to" step to an invalid target step. As another example, the valid steps within the workflow can be visually modified to emphasize that they are valid targets of the "Go back to" step. In some embodiments, a user interface element, such as a dropdown list of valid target steps, is populated based on the applied target restrictions.

At 313, the target step for the transfer control step is received and the transfer control step is updated. For example, in response to the user selecting a desired target step for the transfer control or "Go back to" step, a target step is received by the workflow creation service. The received target step conforms to the restrictions applied at 309 and is used to update the transfer control step. For example, a representation of the workflow, such as a workflow tree or abstract syntax tree is updated to reflect the desired target. In some embodiments, the node corresponding to the "Go back to" step is updated to include a reference to the node of the target step. In some embodiments, the target step can also include a backwards link to the "Go back to" step. The backwards link can help identify a "Go back to" step in the event the target step is later removed from the workflow. In various embodiments, the target step is selected by the user connecting the "Go back to" and target steps via a graphical interactive action and feedback of the established connection is reflected visually in the workflow graphical creation tool.

At 315, the transfer control step is disallowed at the requested location. For example, the requested location of the transfer control step is not a valid location for a transfer control step and the requested transfer control step is disallowed. In some embodiments, the graphical tool will not allow the user to place the transfer control step at a disallowed location. For example, when a user attempts to drag a "Go back to" user interface element to a disallowed location, the GUI will provide a visual indicator that the location is incompatible with the transfer control action.

Figure 4:
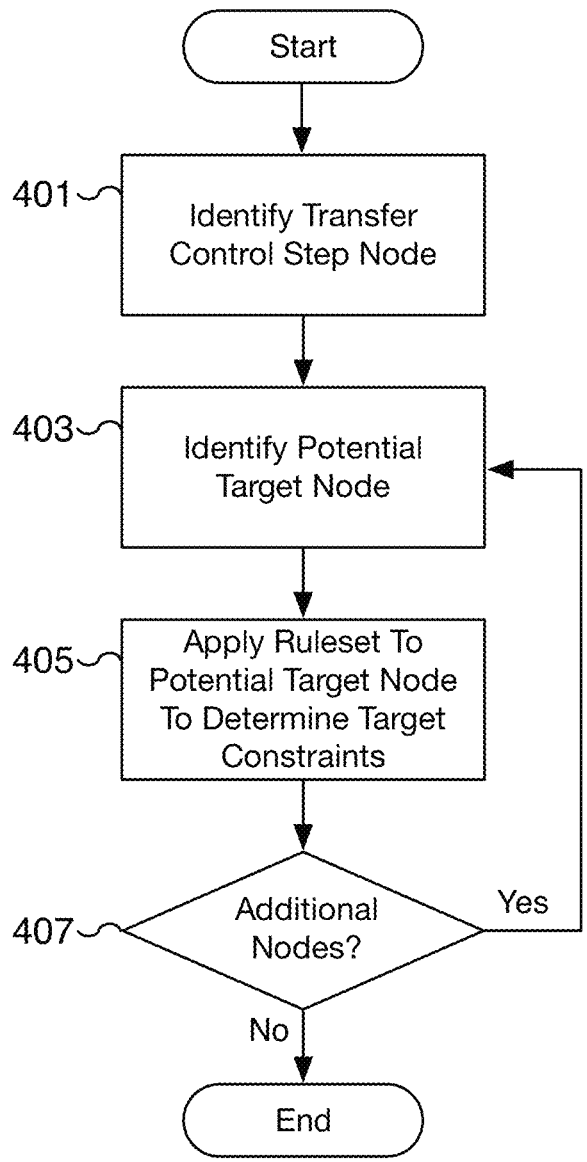
FIG. 4 is a flow chart illustrating an embodiment of a process for analyzing a digital workflow to determine transfer control target constraints.

FIG. 4 is a flow chart illustrating an embodiment of a process for analyzing a digital workflow to determine transfer control target constraints. For example, in response to a request to add a new program transfer control step to a workflow, the workflow is analyzed to determine target step constraints for the new transfer control step. The determined constraints identify which steps of the workflow are valid and invalid targets of the transfer control step. For example, only certain locations within a workflow are valid targets for a transfer control step to which transfer of the workflow execution should be allowed. In some embodiments, each step of the workflow is analyzed by evaluating nodes of a workflow tree, where the nodes correspond to the steps of the workflow. For example, an abstract syntax tree representing the workflow steps can be traversed to identify valid and invalid target nodes and their corresponding steps. In some embodiments, the process of FIG. 4 is performed by a workflow creation service as part of adding a transfer control step to a digital workflow. In some embodiments, the process of FIG. 4 is performed at 203 of FIG. 2 and/or at 309 of FIG. 3 by workflow creation service 123 of FIG. 1.

At 401, the transfer control step node is identified. For example, the appropriate node corresponding to the transfer control step in a representation of the workflow is identified. In some embodiments, the transfer control step corresponds to a node in a workflow tree such as an abstract syntax tree representing the workflow steps. The node corresponding to the transfer control step node is identified and used to determine which other nodes of the workflow are valid targets to which workflow execution can be transferred.

At 403, a potential target node is identified. For example, a node that has not been analyzed as a potential target is identified. In some embodiments, the potential target node is identified by traversing the workflow using a tree traversal technique, such as a depth-first or breadth-first traversal to identify the next potential target node. In some embodiments, the nodes are traversed starting from the root of the workflow tree. In some embodiments, the nodes are traversed starting at the transfer control step node identified at 401. For example, the workflow tree can be traversed by starting at the transfer control step node and moving up the workflow tree and also moving down the workflow tree to identify potential target nodes.

At 405, a ruleset is applied to the potential target node to determine target constraints. For example, the rules of a configured constraints ruleset defining target node requirements are applied to the potential target node identified at 403. In some embodiments, the constraints ruleset includes multiple rules defining which target nodes (and their corresponding steps) are valid targets. The rules are applied until a determination is made whether the identified node is a valid or invalid target. For example, one example rule of the ruleset can require that the target node must precede the transfer control node within the workflow. Any nodes identified by traversing down the workflow tree from the transfer control node can be marked as invalid targets. However, any nodes identified by traversing up the workflow tree from the transfer control node will be evaluated against one or more remaining of the rules in the configured ruleset. In some embodiments, a rule within the ruleset can be a compound rule. For example, a rule defined in the constraints ruleset can define multiple requirements for a node to be a valid target.

In some embodiments, the rules included in the ruleset can require that the target node precedes the transfer control node but with an intervening logical conditional action. For example, a target node can be in the same logic branch as the transfer control node but there must exist a conditional action node between the two. The rules can also require that the target node is not within a child logic branch, is not in a parallel execution path, is not in a different decision path (such as within a sibling branch with respect to a conditional action node), and does not precede the target node without branching logic (such as immediately preceding the transfer control node and/or within the same child logic branch as the transfer control node). Other rules can be configured as well to add additional constraints and/or to allow additional placement flexibility. In some embodiments, some placement locations are valid but will trigger a warning or similar notification. For example, a valid target node can exist outside of a loop that embeds the transfer control node (pending other rules) but selecting a target node outside of the loop logic can trigger a warning that the transfer control step will break or exit the loop.

At 407, a determination is made whether additional nodes that require evaluation exist. In the event an additional node that requires evaluation as a target node exists, processing loops back to 403 where another potential target node is identified for application of the constraints ruleset. In the event no additional node that requires evaluation as a target step exists, processing ends and no additional transfer control target constraints are identified.

Figure 5:
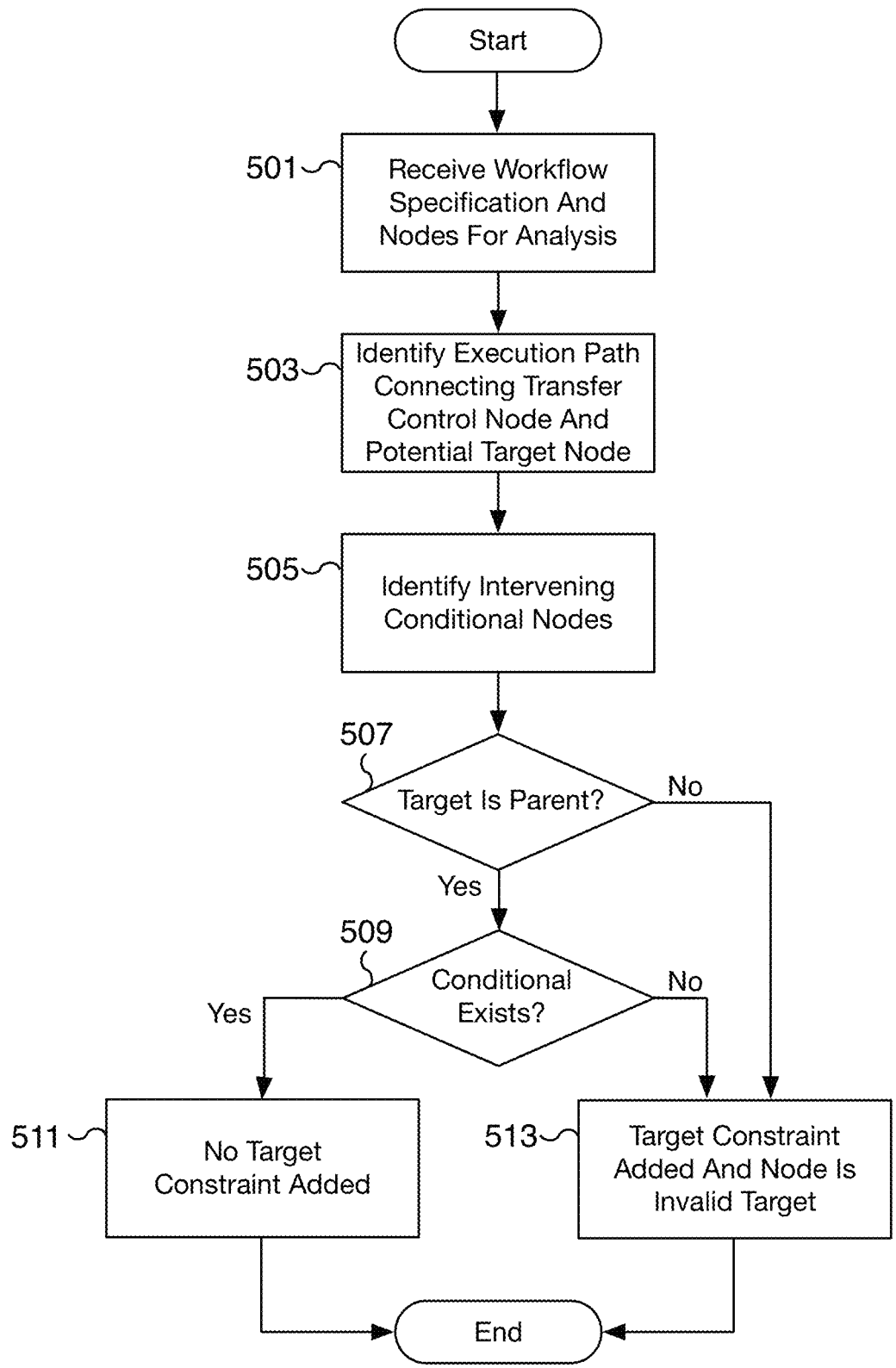
FIG. 5 is a flow chart illustrating an embodiment of a process for applying a rule of a constraints ruleset to determine transfer control target constraints for a potential target node.

FIG. 5 is a flow chart illustrating an embodiment of a process for applying a rule of a constraints ruleset to determine transfer control target constraints for a potential target node. For example, the process of FIG. 5 is one example of a process that applies a specific rule of a constraints ruleset to a potential target node. In various embodiments, other rules can be included within the constraints ruleset to apply additional requirements to determine transfer control target constraints. In some embodiments, the process of FIG. 5 is performed using a specification of the workflow such as an abstract syntax tree to determine whether a potential node is a valid target of a transfer control node. In some embodiments, the process of FIG. 5 is performed by a workflow creation service as part of adding a transfer control step to a digital workflow. In some embodiments, the process of FIG. 5 is performed at 203 of FIG. 2, at 309 of FIG. 3, and/or at 405 of FIG. 4 by workflow creation service 123 of FIG. 1.

At 501, the workflow specification and nodes for analysis are received. For example, a specification of the workflow such as a workflow tree or abstract syntax tree defining the workflow is received. Additionally, the nodes used for analysis are also identified including the transfer control (or "Go back to") node that is the source of the transfer control action and a node being evaluated as a potential target of the transfer control (or "Go back to") node.

At 503, the execution path between the transfer control node and the potential target node is identified. For example, the workflow tree is analyzed to identify the path between the two nodes. The identified path may be a logical tree of nodes corresponding to the steps that are executed to reach the transfer control node from the potential target node. In various embodiments, the identified path is intended for traversal in the direction starting from the potential target node to the transfer control node. In some embodiments, the path is a logical branch with multiple intervening nodes. In determining the execution path between the transfer control node and the potential target node, a determination can be made whether the potential target node preceded (or is a parent of) the transfer control node.

At 505, intervening conditional nodes are identified. For example, the execution path between the transfer control node and the potential target node is traversed and each intermediate node is analyzed to determine whether an intermediate node corresponds to a conditional action step that creates a logical branch. For example, an intermediate node located in the execution path between steps corresponding to the potential target node and the transfer control node can be analyzed to determine whether it corresponds to an If/Else/Else If conditional action, a decision action (such as after a "Make a Decision" action), or a catch of a try action. In various embodiments, fewer or more conditional nodes can be supported as well.

In some embodiments, additional analysis can be performed at 505 to implement additional constraints other than a requirement for an intervening conditional node. For example, each intermediate node can be analyzed to determine whether an intermediate node corresponds to a loop. In the event the transfer control action is embedded within a loop and a determination is later made at 511 that the potential target node is a valid target, a notification can be provided to the user as a warning that the transfer control action can result in breaking out of (or exiting) a loop.

At 507, a determination is made whether the target node is a parent of the transfer control node. In the event the target node is a parent of the transfer control node, processing proceeds to 509. In the event the target node is not a parent of the transfer control node, processing proceeds to 513.

At 509, a determination is made whether an intervening conditional node located between the target node and the transfer control node exists. In the event an intervening conditional node exists, processing proceeds to 511. In the event an intervening conditional node does not exist, processing proceeds to 513.

At 511, no target constraint is added to the potential target node. For example, the potential target node identified at 501 meets the current applied rule of the ruleset and remains a valid target. In some embodiments, additional rules of the ruleset may exist and will be applied to further determine additional constraints. However, with respect to the rule implemented by the process of FIG. 5, no additional target constraints are applied to the node and the potential target node remains a valid target.

At 513, a target constraint is added to the potential target node and the node is identified as an invalid target. For example, based on the application of the rule implemented by the process of FIG. 5, the potential target node identified at 501 does not meet the requirements of a valid target. The potential target node is identified as an invalid target of the transfer control step and a target constraint is added to the node. In some embodiments, additional rules of the ruleset may exist to apply additional constraints. In some embodiments, once a node is no longer a valid target, no additional rules of the ruleset need to be applied.

Figure 6:
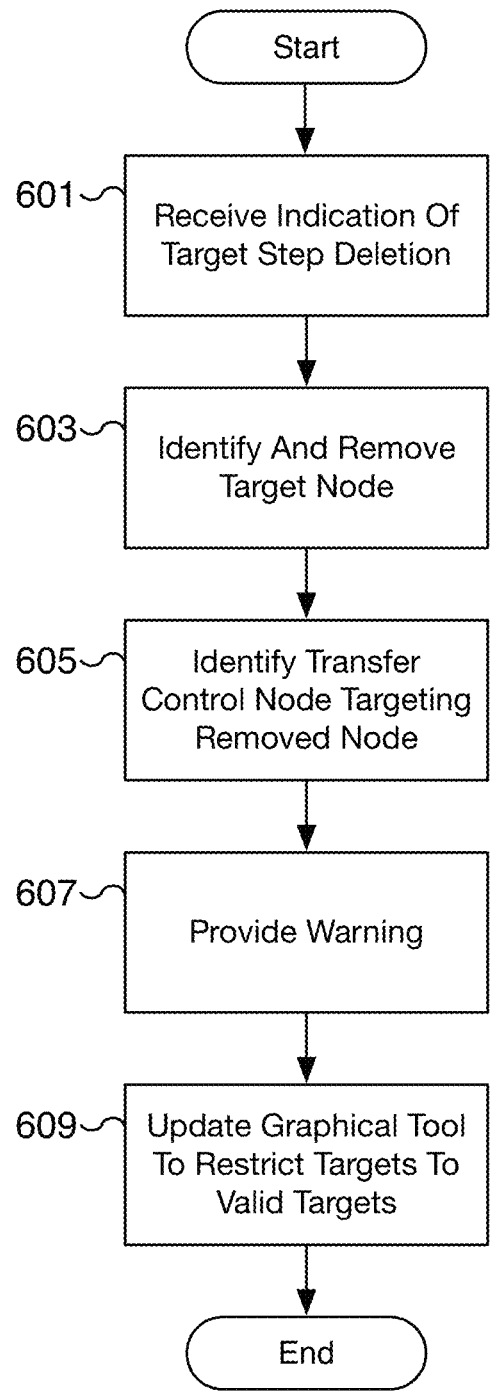
FIG. 6 is a flow chart illustrating an embodiment of a process for applying a transfer control constraint when a target node is removed.

FIG. 6 is a flow chart illustrating an embodiment of a process for applying a transfer control constraint when a target node is removed. For example, the process of FIG. 6 is performed when a target step of a corresponding transfer control step is removed from a workflow leaving the transfer control step without a valid target. In response to the removal, the user is informed that the corresponding transfer control step no longer references a valid target step. In some embodiments, the process of FIG. 6 is performed using a specification of the workflow such as an abstract syntax tree to determine the impacted transfer control node. In some embodiments, the process of FIG. 6 is performed by a workflow creation service as part of a validation process performed for a digital workflow when a workflow with a transfer control step is modified and/or saved. In some embodiments, the process of FIG. 6 is performed at 203 of FIG. 2 by workflow creation service 123 of FIG. 1.

At 601, an indication that a target step has been deleted is received. For example, a workflow creation service receives an indication that a step within the workflow that is targeted by a transfer control step has been deleted. The deletion can be triggered by a user via a graphical workflow tool.

At 603, the target node is identified and removed. For example, in response to receiving the deletion indication at 601, the node corresponding to the deleted step is identified. For example, the node corresponding to the deleted target step is identified within a workflow specification such as a workflow tree. In some embodiments, the node is a node of an abstract syntax tree representing the workflow. Once the target node is identified, it can be removed from the workflow representation, such as removing the node from the abstract syntax tree representing the workflow. Although the target node can be removed, the contents of the node and its properties can be retained for additional processing such as locating the corresponding target transfer node.

At 605, the transfer control node targeting the removed node is identified. For example, the workflow representation is searched to identify the transfer control node targeting the removed target node. In some embodiments, the workflow specification represented as a tree is traversed to identify the transfer control node. For example, the entire tree can be traversed starting at the root of the tree. In some embodiments, transfer control steps must target previous steps and the traversal for the transfer control node starts at the identified target node. In some embodiments, the removed node has a backwards link (or reference) to the transfer control node and no tree traversal is required. In various embodiments, the transfer control node is updated to no longer target the removed target node.

At 607, a warning is provided. For example, a warning is provided to the user that the target step deletion has resulted in a transfer control step that lacks a valid target. In some embodiments, the notification is a visual notification provided via the graphical workflow tool. For example, the warning can emphasize a visual user interface element associated with the identified transfer control step along with a description of the steps required to remedy the issue, such as the requirement for the transfer control step to target a valid target step.

At 609, the graphical workflow tool is updated to restrict targets of the transfer control step to valid targets. For example, the workflow specification is analyzed to identify workflow constraints such as valid and invalid targets for the transfer control step identified at 605. In some embodiments, once the valid and invalid target nodes and their corresponding steps are identified, the graphical workflow tool is updated with the determined constraints. In some embodiments, a visual representation of the workflow that is shown within the graphical workflow tool is updated to display the determined constraints, such as which steps are valid targets for the transfer control step identified at 605.

Figure 7:
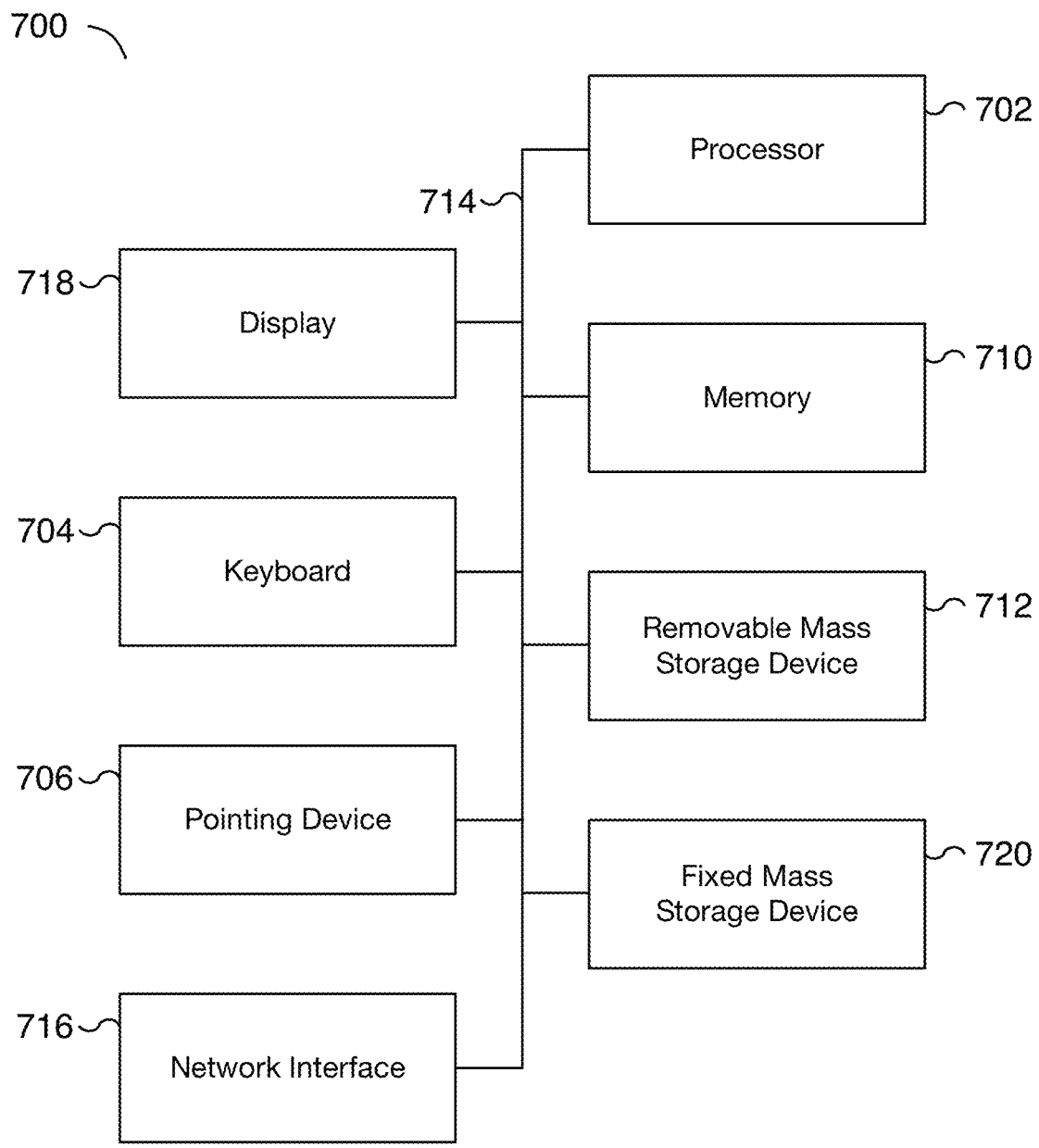
FIG. 7 is a functional diagram illustrating a programmed computer system for creating and executing digital workflows using a low code or codeless workflow service.

FIG. 7 is a functional diagram illustrating a programmed computer system for creating and executing digital workflows using a low code or codeless workflow service. As will be apparent, other computer system architectures and configurations can be utilized for creating and executing digital workflows using a low code or codeless workflow service. Examples of computer system 700 include client 101 of FIG. 1 and/or one or more computers of cloud service 111 of FIG. 1 including one or more computers of workflow service 121 of FIG. 1, workflow creation service 123 of FIG. 1, and/or workflow execution service 125 of FIG. 1. Computer system 700, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system 700. Using instructions retrieved from memory 710, the processor 702 controls the reception and manipulation of input data, and the output and display of data on output devices (e.g., display 718). In various embodiments, one or more instances of computer system 700 can be used to implement at least portions of the processes of FIGS. 2-6 and/or the user interfaces and/or underlying functionality associated with the user interface diagrams of FIGS. 8-14.

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data and objects used by the processor 702 to perform its functions (e.g., programmed instructions). For example, memory 710 can include any suitable computer-readable storage media, described below, depending on whether, for example, data access needs to be bi-directional or unidirectional. For example, processor 702 can also directly and very rapidly retrieve and store frequently needed data in a cache memory (not shown).

A removable mass storage device 712 provides additional data storage capacity for the computer system 700, and is coupled either bi-directionally (read/write) or unidirectionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storages 712, 720 generally store additional programming instructions, data, and the like that typically are not in active use by the processor 702. It will be appreciated that the information retained within mass storages 712 and 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

Figure 8:
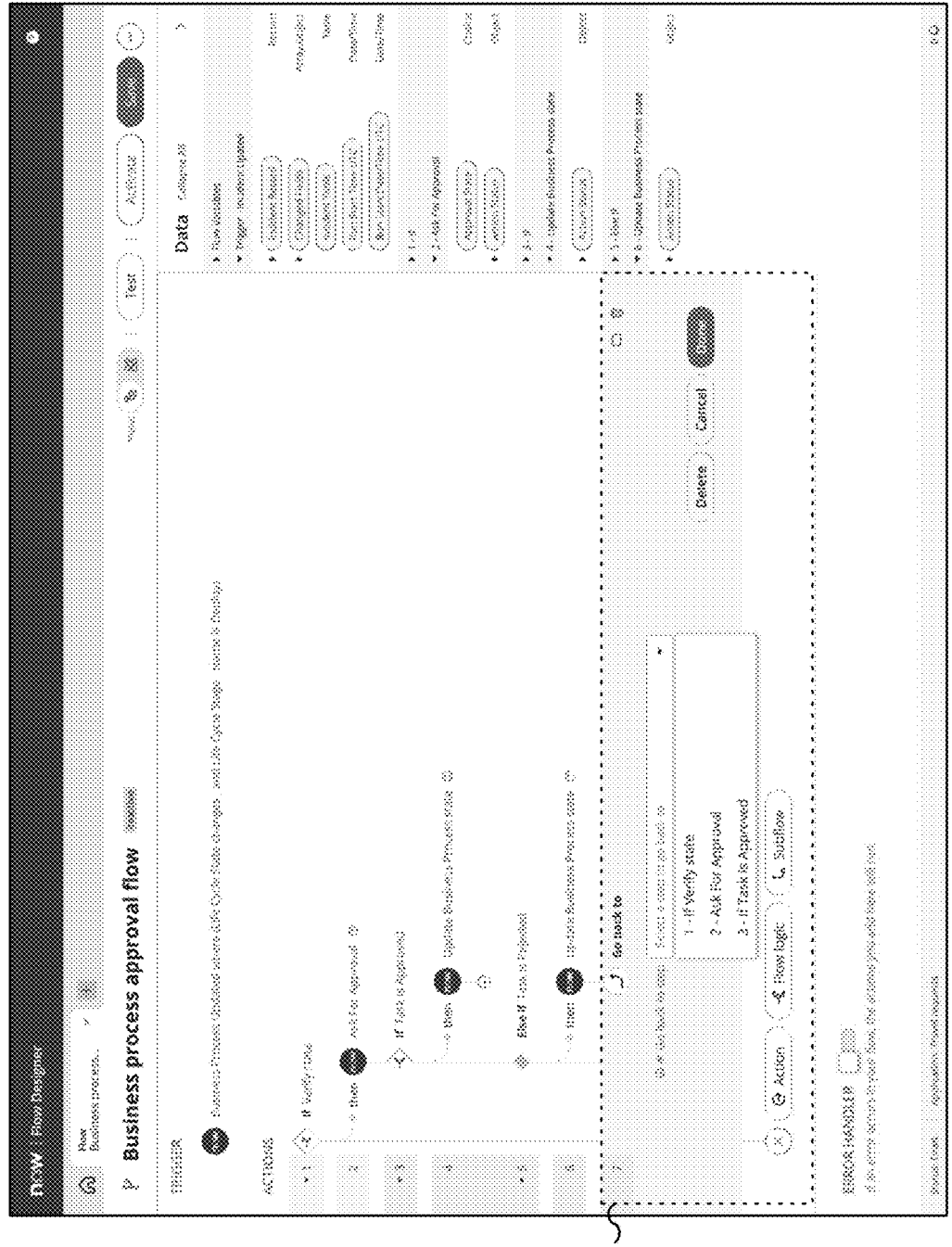
FIG. 8 is a diagram illustrating an embodiment of a user interface for selecting a valid target step for a transfer control step using a low code or codeless workflow service.

FIG. 8 is a diagram illustrating an embodiment of a user interface for selecting a valid target step for a transfer control step using a low code or codeless workflow service. In some embodiments, user interface 800 is provided by a workflow creation service as part of a graphical tool for creating digital workflows. User interface 800 includes transfer control step user interface section 801 corresponding to the inserting of step 7, a transfer control step, that has yet to be configured with a target step. As shown in FIG. 8, transfer control step user interface section 801 displays valid target steps of the workflow for transfer control step 7 including valid target steps 1, 2, and 3. Invalid steps for transfer control step 7 (i.e., steps 4, 5, and 6) are not included in the list of valid target steps. In some embodiments, the valid and invalid steps are determined by the workflow creation service by applying rules of a constraints ruleset. In some embodiments, the workflow creation service is workflow creation service 123 of FIG. 1 and at least portions of the functionality of user interface 800 including the portions of the functionality corresponding to transfer control step user interface section 801 are performed using the processes of FIGS. 2-5.

Figure 9:
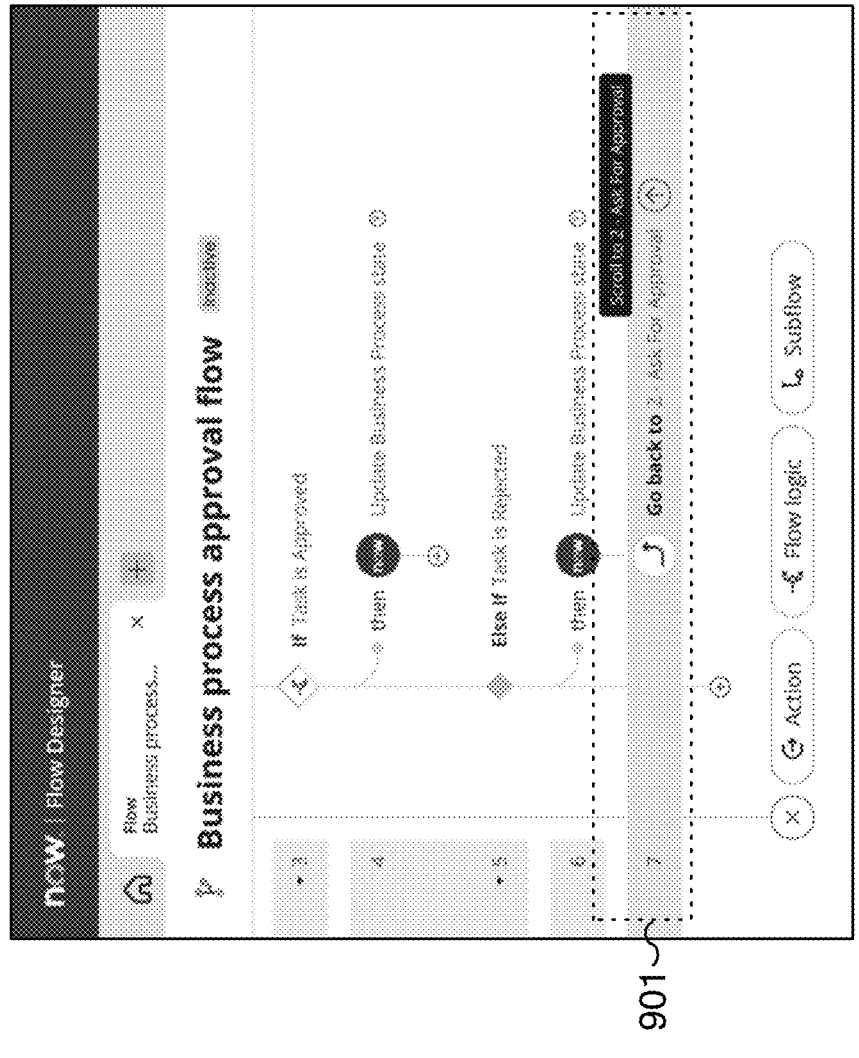
FIG. 9 is a diagram illustrating an embodiment of a user interface for interfacing with a transfer control step using a low code or codeless workflow service.

FIG. 9 is a diagram illustrating an embodiment of a user interface for interfacing with a transfer control step using a low code or codeless workflow service. In some embodiments, user interface 900 is a portion of a user interface provided by a workflow creation service as part of a graphical tool for creating digital workflows. User interface 900 includes transfer control step user interface section 901 corresponding to the step 7, a transfer control step. As shown in FIG. 9, transfer control step user interface section 901 displays a transfer control or "Go back to" step that targets step 2 (labeled "2—Ask For Approval"). As shown in FIG. 9, transfer control step user interface section 901 includes an interactive upwards facing arrow user interface element (labeled "Scroll to 2—Ask For Approval") that allows the user to quickly navigate (or scroll) to the configured target step. The functionality shown in transfer control step user interface section 901 allows a user to quickly navigate to a target step including one that is not visible and is particularly helpful for navigating long and complex workflows. In some embodiments, the workflow of user interface 900 is the workflow of user interface 800 of FIG. 8 after transfer control step 7 has been configured with a valid target step (targeting step 2). In some embodiments, the workflow creation service is workflow creation service 123 of FIG. 1 and at least portions of the functionality of user interface 900 including the portions of the functionality corresponding to transfer control step user interface section 901 are performed using the processes of FIGS. 2-5.

Figure 10:
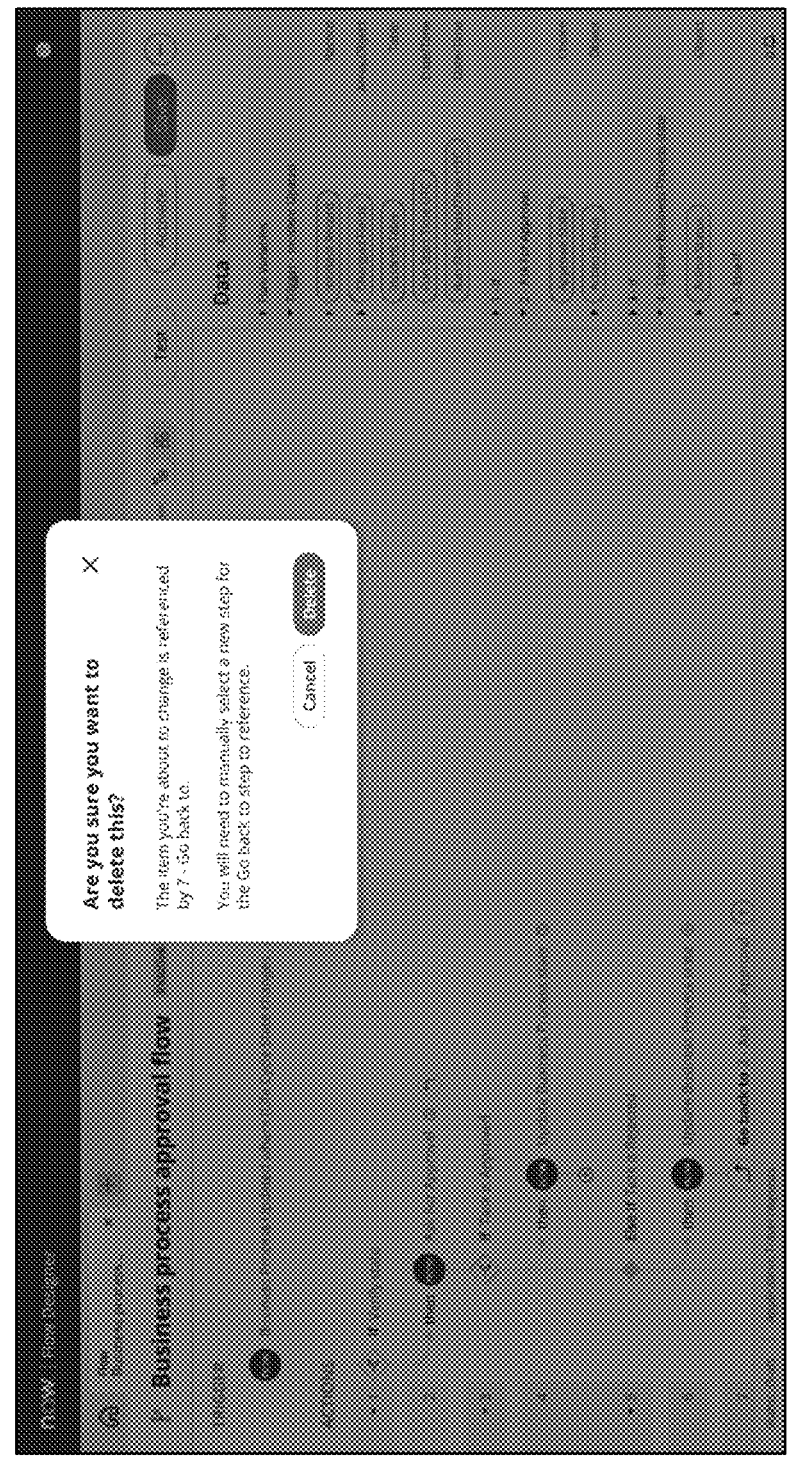
FIG. 10 is a diagram illustrating an embodiment of a user interface for creating a digital workflow with a transfer control step using a low code or codeless workflow service.

FIG. 10 is a diagram illustrating an embodiment of a user interface for creating a digital workflow with a transfer control step using a low code or codeless workflow service. In some embodiments, user interface 1000 is a user interface provided by a workflow creation service as part of a graphical tool for creating digital workflows. User interface 1000 is displayed when an attempt is made to modify a target step in a manner that impacts a corresponding transfer control step. For example, a user can attempt to delete a target step that would result in the corresponding transfer control step targeting a step that no longer exists. In the example shown in FIG. 10, the warning message is displayed when a user attempts to delete step 2, the target step of transfer control step 7. In some embodiments, the workflow of user interface 1000 is the workflow of user interface 900 of FIG. 9 after the user has attempted to delete target step 2. In some embodiments, the workflow creation service is workflow creation service 123 of FIG. 1 and at least portions of the functionality of user interface 1000 are performed using the processes of FIGS. 2-6 and, in particular, the warning message of user interface 1000 is displayed as part of performing the process of FIG. 6.

Figure 11:
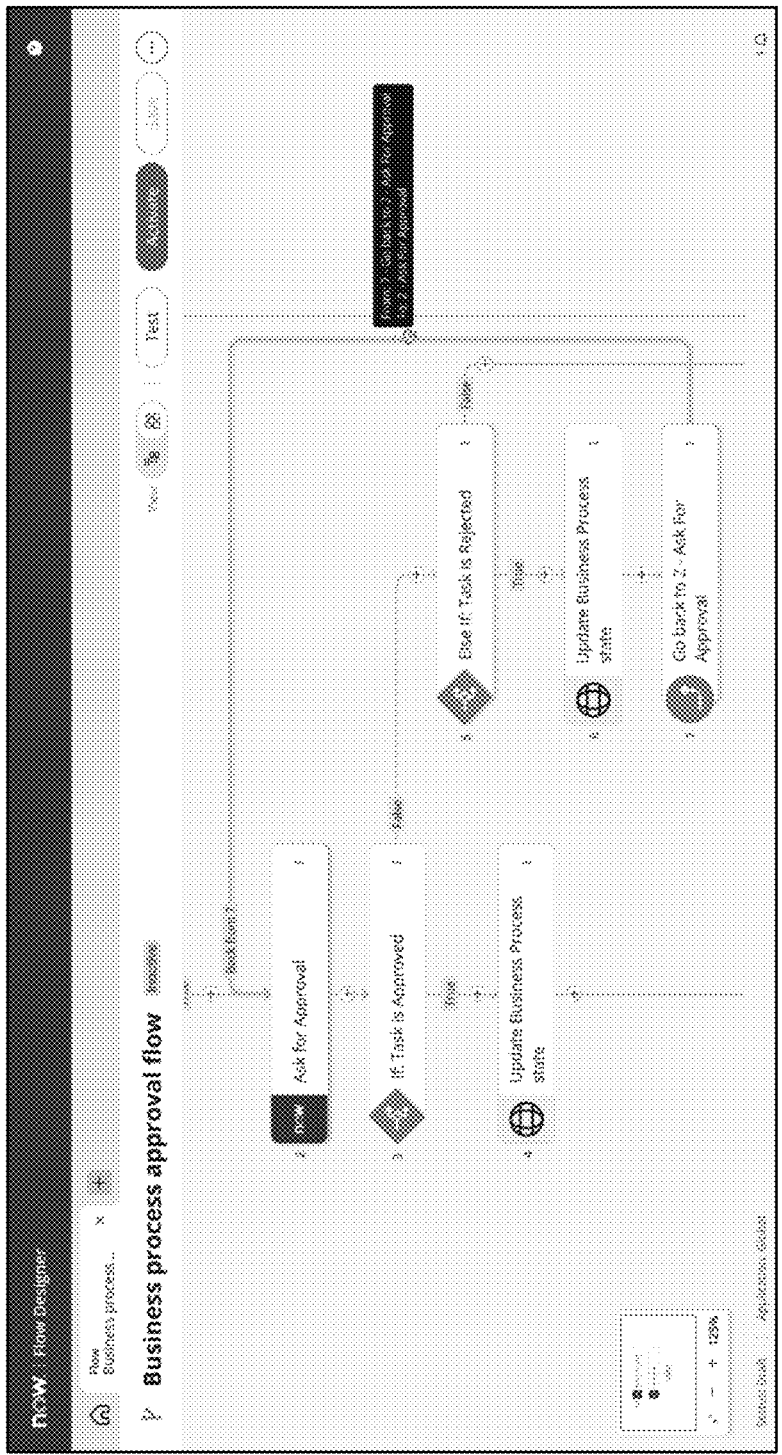
FIG. 11 is a diagram illustrating an embodiment of a user interface for interfacing with a transfer control step using a low code or codeless workflow service.

FIG. 11 is a diagram illustrating an embodiment of a user interface for interfacing with a transfer control step using a low code or codeless workflow service. In some embodiments, user interface 1100 is a user interface provided by a workflow creation service as part of a graphical tool for creating digital workflows. The workflow shown in user interface 1100 includes transfer control step 7 that targets step 2. In various embodiments, the workflow of user interface 1100 corresponds to the workflow of user interface 900 of FIG. 9 but with the workflow displayed using an alternative visual representation. As shown in user interface 1100, transfer control step 7 is visually connected to target step 2 and the visual connection includes a label describing the transfer control relationship of the two steps. In some embodiments, the workflow creation service is workflow creation service 123 of FIG. 1 and at least portions of the functionality of user interface 1100 are performed using the processes of FIGS. 2-5.

Figure 12:
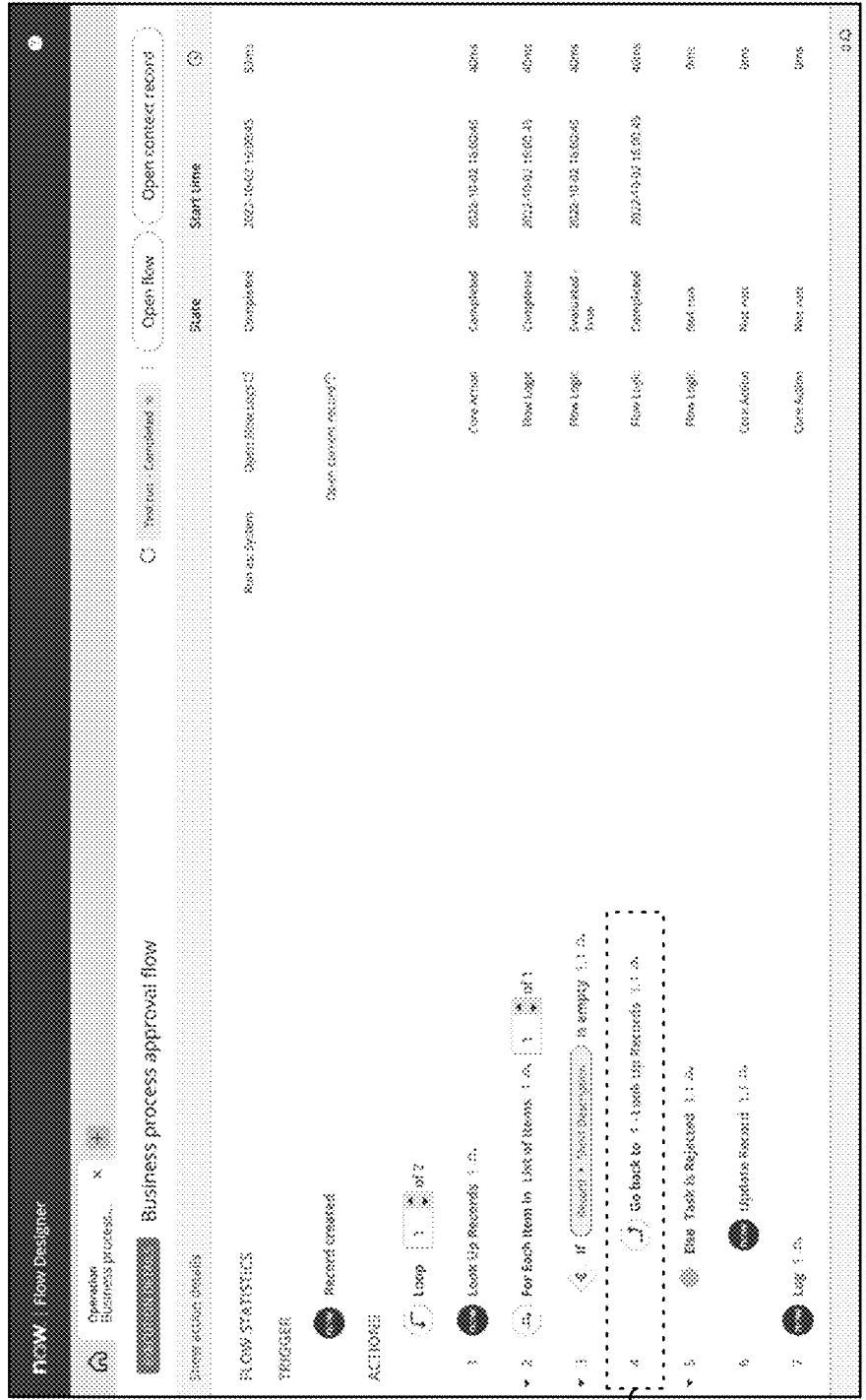
FIG. 12 is a diagram illustrating an embodiment of a user interface of a low code or codeless workflow service for a digital workflow with a transfer control step embedded within a loop.

FIG. 12 is a diagram illustrating an embodiment of a user interface of a low code or codeless workflow service for a digital workflow with a transfer control step embedded within a loop. In some embodiments, user interface 1200 is a user interface provided by a workflow creation service as part of a graphical tool for creating digital workflows. User interface 1200 includes transfer control step user interface section 1201 corresponding to the step 4, a transfer control step. As shown in FIG. 12, transfer control step user interface section 1201 displays a transfer control or "Go back to" step that targets step 1 (labeled "1-Look Up Records"). In various embodiments, the disclosed transfer control action can be assigned to a step that is embedded within a loop, such as the "for each" loop starting at step 2. The transfer control target of transfer control step 4 is outside of the loop and allows the workflow to transfer execution from step 4 to step 1. In some embodiments, the workflow creation service is workflow creation service 123 of FIG. 1 and at least portions of the functionality of user interface 1200 including the portions of the functionality corresponding to transfer control step user interface section 1201 are performed using the processes of FIGS. 2-5.

Figure 13:
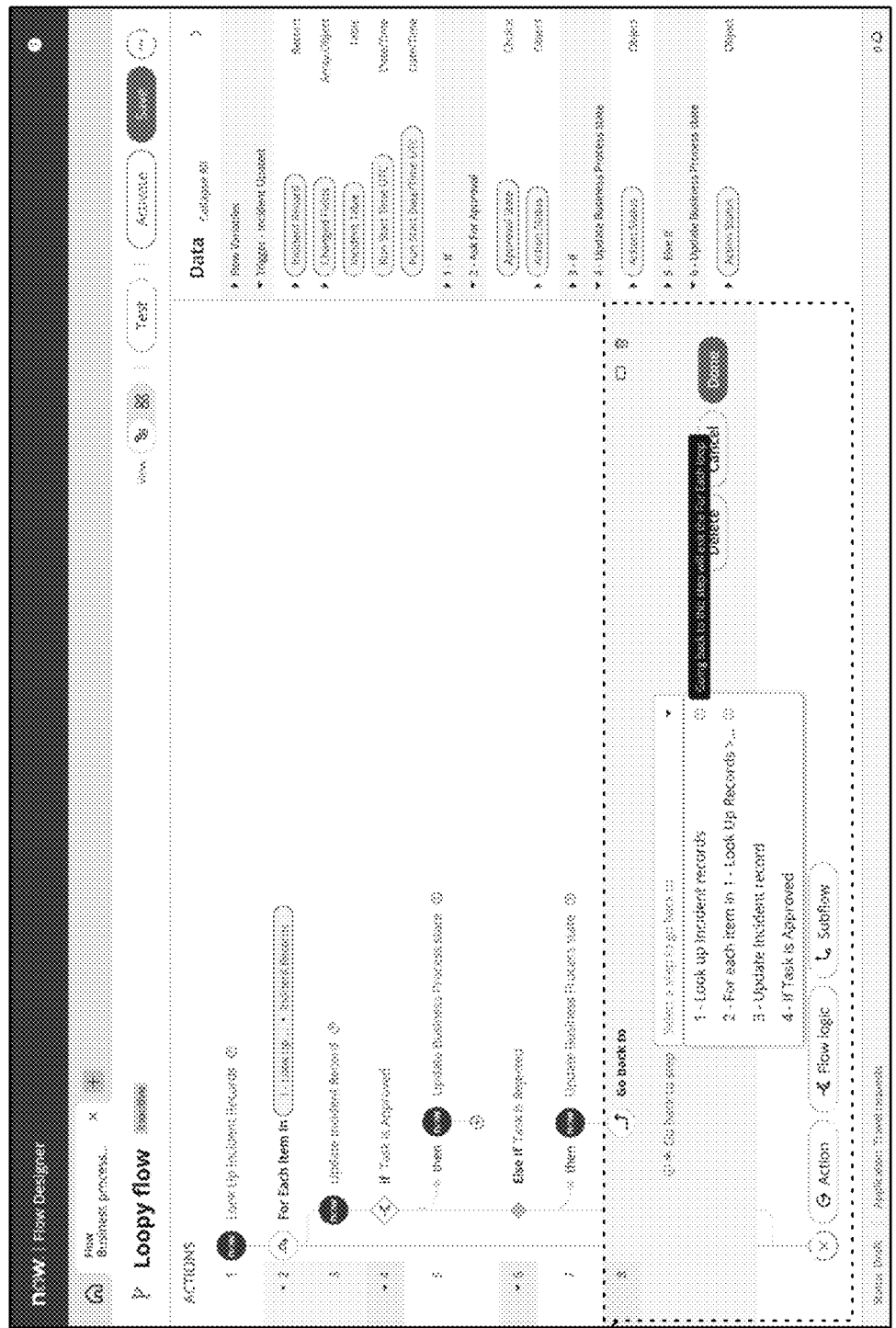
FIG. 13 is a diagram illustrating an embodiment of a user interface of a low code or codeless workflow service for selecting a valid target step for a transfer control step embedded within a loop.

FIG. 13 is a diagram illustrating an embodiment of a user interface of a low code or codeless workflow service for selecting a valid target step for a transfer control step embedded within a loop. In some embodiments, user interface 1300 is provided by a workflow creation service as part of a graphical tool for creating digital workflows. User interface 1300 includes transfer control step user interface section 1301 corresponding to the inserting of step 8, a transfer control step, within a loop. In the example shown, transfer control step 8 has yet to be configured with a target step. As shown in FIG. 13, transfer control step user interface section 801 displays valid target steps of the workflow for transfer control step 8 including valid target steps 1, 2, 3, and 4. Invalid steps for transfer control step 8 (i.e., steps 5, 6, and 7) are not included in the list of valid target steps. In FIG. 13, user interface 1300 displays additional warnings for valid target steps 1 and 2 that are located outside of the loop. Although steps 1 and 2 are valid target steps, the additional warnings help notify the user of potentially unexpected consequences when selecting either target step. Target steps 3 and 4 are also valid target steps but are located within the loop and do not have corresponding warnings. In some embodiments, the valid and invalid steps are determined by the workflow creation service by applying rules of a constraints ruleset. In some embodiments, the workflow creation service is workflow creation service 123 of FIG. 1 and at least portions of the functionality of user interface 1300 including the portions of the functionality corresponding to transfer control step user interface section 1301 are performed using the processes of FIGS. 2-5.

Figure 14:
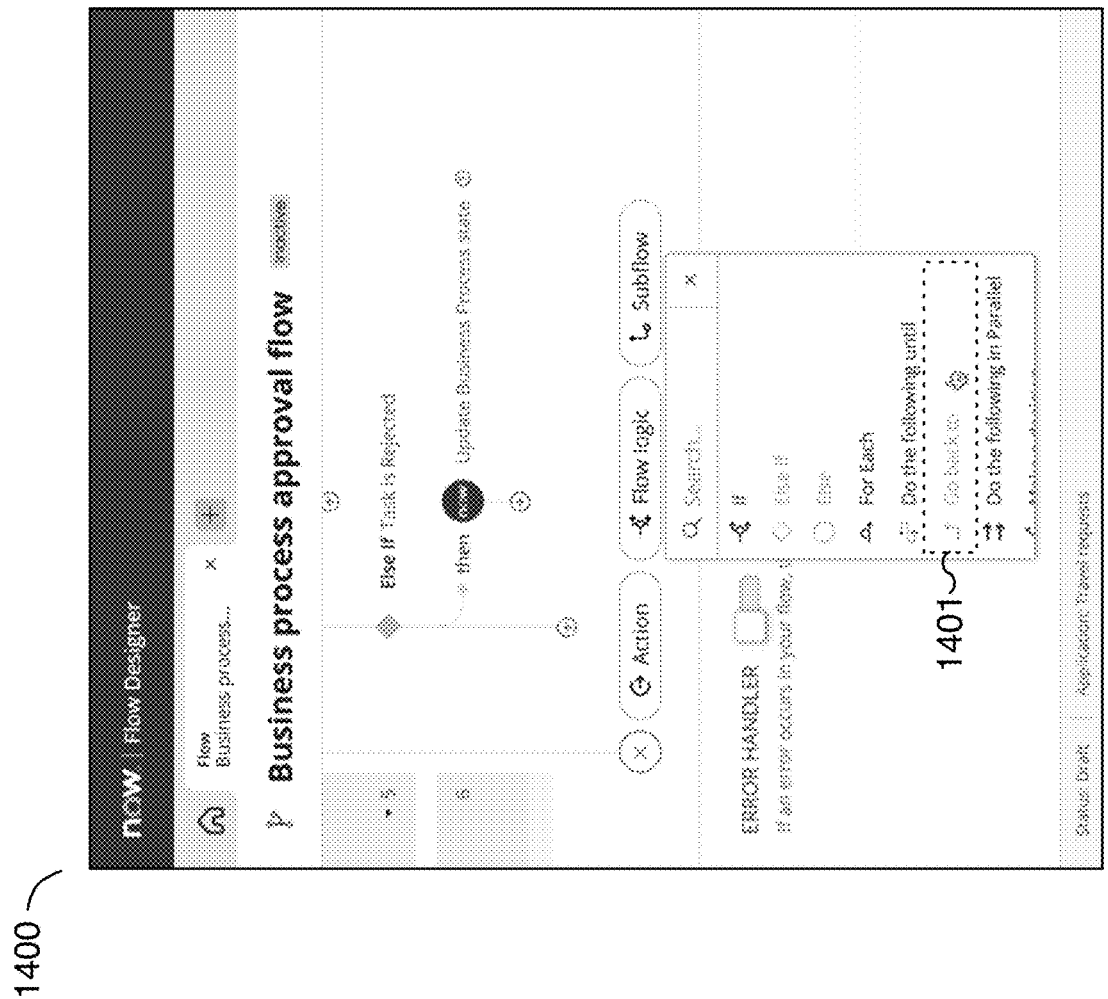
FIG. 14 is a diagram illustrating an embodiment of a user interface for creating a digital workflow using a low code or codeless workflow service that supports transfer control steps.

FIG. 14 is a diagram illustrating an embodiment of a user interface for creating a digital workflow using a low code or codeless workflow service that supports constraints for transfer control steps. In some embodiments, user interface 1400 is provided by a workflow creation service as part of a graphical tool for creating digital workflows. User interface 1400 includes transfer control step user interface section 1401 as part of the user interface step insertion dialog for inserting a new step. In various embodiments, the user interface step insertion dialog includes different actions that are determined to be valid for the selected step. For example, the user interface step insertion dialog displays valid actions for the selected step such as an "If" action, a "For Each" action, a "Do the following until" action, and a "Do the following in Parallel" action. Other available and valid actions can be shown by scrolling through the user interface step insertion dialog.

In the example shown, the transfer control or "Go back to" action of transfer control step user interface section 1401 is inactive and not available for selection. In various embodiments, a determination is made that the transfer control action is not a valid (or safe) action to perform at the selected step. For example, the insertion of a transfer control or "Go back to" action at the selected step could create an infinite loop or another unsafe workflow condition. In various embodiments, the constraint is determined by the workflow creation service and enforced by the GUI. In some embodiments, the workflow creation service is workflow creation service 123 of FIG. 1 and at least portions of the functionality of user interface 1400 including the portions of the functionality corresponding to transfer control step user interface section 1401 and its constraints are performed using the processes of FIGS. 2-5.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   receiving, by way of a graphical user interface of a computing system, a specification of one or more a plurality of steps of a digital workflow;
   receiving, by way of the graphical user interface, an indication that a program transfer control step in the digital workflow is to return to a previously specified step in the digital workflow;
   analyzing, by the computing system, the specification of the plurality of steps of the digital workflow to determine, in the digital workflow, one or more valid target steps of the program transfer control step;
   based on the one or more valid target steps of the program transfer control step, restricting, by the computing system and in the graphical user interface, connection of the program transfer control step in the digital workflow to the one or more valid target steps; and
   updating in the graphical user interface, a graph representation of the digital workflow to include a transfer control node corresponding to the program transfer control step.

2. The method of claim 1, wherein analyzing the specification of the plurality of steps of the digital workflow includes identifying a potential target step of the program transfer control step.

3. The method of claim 2, wherein the potential target step precedes the program transfer control step in an execution path of the digital workflow.

4. The method of claim 2, wherein analyzing the specification of the plurality of steps of the digital workflow includes identifying an intermediate step of the program transfer control step located after the potential target step and before the program transfer control step.

5. The method of claim 4, wherein analyzing the specification of the plurality of steps of the digital workflow includes determining that the intermediate step corresponds to a conditional branch action.

6. The method of claim 5, wherein the conditional branch action corresponds to an If/Else/Else If type action, a decision action, or a catch action.

7. The method of claim 4, wherein analyzing the specification of the plurality of steps of the digital workflow includes determining the intermediate step corresponds to a loop action.

8. The method of claim 7, further comprising providing a warning message in response to determining that the intermediate step corresponds to the loop action.

9. The method of claim 1, further comprising:
receiving, by way of the graphical user interface, selection of a target step from the one or more valid target steps; and
updating, in the graph representation, the digital workflow to include an execution path between the transfer control node and a further node corresponding to the target step.

10. The method of claim 9, further comprising:
executing, by the computing system, a deployed version of the digital workflow, the execution including traversal of the execution path between the transfer control node and the further node.

11. The method of claim 1, wherein updating in the graphical user interface, the graph representation of the digital workflow comprises updating the graph representation of the digital workflow to include the transfer control node corresponding to the program transfer control step.

12. The method of claim 1, wherein the graph representation of the digital workflow includes an abstract syntax tree.

13. A system comprising:
one or more processors; and
a memory coupled to the one or more processors, wherein the memory is configured to provide the one or more processors with instructions which when executed cause the one or more processors to:
receive, by way of a graphical user interface, a specification of a plurality of steps of a digital workflow;
receive, by way of the graphical user interface, an indication that a program transfer control step in the digital workflow is to return to a previously specified step in the digital workflow;
analyze the specification of the plurality of steps of the digital workflow to determine, in the digital workflow, one or more valid target steps of the program transfer control step;
based on the one or more valid target steps of the program transfer control step, restrict, in the graphical user interface, connection of the program transfer control step in the digital workflow to the one or more valid target steps; and
update in the graphical user interface, a graph representation of the digital workflow to include a transfer control node corresponding to the program transfer control step.

14. The system of claim 13, wherein analyzing the specification of the plurality of steps of the digital workflow includes identifying a potential target step of the program transfer control step.

15. The system of claim 14, wherein the potential target step precedes the program transfer control step in an execution path of the digital workflow.

16. The system of claim 14, wherein analyzing the specification of the plurality of steps of the digital workflow includes identifying an intermediate step of the program transfer control step located after the potential target step and before the program transfer control step.

17. The system of claim 16, wherein analyzing the specification of the plurality of steps of the digital workflow includes determining that the intermediate step corresponds to a conditional branch action.

18. The system of claim 17, wherein the conditional branch action corresponds to an If/Else/Else If type action, a decision action, or a catch action.

19. The system of claim 16, wherein analyzing the specification of the plurality of steps of the digital workflow includes determining that the intermediate step corresponds to a loop action.

20. A computer program product, the computer program product being embodied in a non-transitory computer readable storage medium and comprising computer instructions for:
receiving, by way of a graphical user interface, a specification of a plurality of steps of a digital workflow;
receiving, by way of the graphical user interface, an indication that a program transfer control step in the digital workflow is to return to a previously specified step in the digital workflow;
analyzing the specification of the plurality of steps of the digital workflow to determine, in the digital workflow, one or more valid target steps of the program transfer control step;
based on the one or more valid target steps of the program transfer control step, restricting, in the graphical user interface, a connection of the program transfer control step in the digital workflow to the one or more valid target steps; and
updating in the graphical user interface, a graph representation of the digital workflow to include a transfer control node corresponding to the program transfer control step.

* * * * *